(12) United States Patent
Finney

(10) Patent No.: US 10,215,246 B2
(45) Date of Patent: Feb. 26, 2019

(54) INTEGRATED TORQUE LIMITER/NO-BACK DEVICE

(71) Applicant: Hamilton Sundstrand Corporation, Windsor Locks, CT (US)

(72) Inventor: Adam M. Finney, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 374 days.

(21) Appl. No.: 14/982,712

(22) Filed: Dec. 29, 2015

(65) Prior Publication Data

US 2017/0184170 A1  Jun. 29, 2017

(51) Int. Cl.
| | |
|---|---|
| *F16D 67/02* | (2006.01) |
| *F16H 35/10* | (2006.01) |
| *B64C 13/28* | (2006.01) |
| *F16D 55/02* | (2006.01) |
| *B64C 13/24* | (2006.01) |
| *F16D 7/00* | (2006.01) |
| *F16D 55/16* | (2006.01) |
| *F16D 43/21* | (2006.01) |
| *F16D 55/48* | (2006.01) |
| *F16D 125/38* | (2012.01) |
| *B64D 45/00* | (2006.01) |

(52) U.S. Cl.
CPC ............ *F16D 67/02* (2013.01); *B64C 13/24* (2013.01); *B64C 13/28* (2013.01); *F16D 7/005* (2013.01); *F16D 55/02* (2013.01); *F16H 35/10* (2013.01); *B64D 2045/001* (2013.01); *F16D 43/215* (2013.01); *F16D 43/218* (2013.01); *F16D 55/16* (2013.01); *F16D 55/48* (2013.01); *F16D 2125/38* (2013.01); *Y02T 50/44* (2013.01)

(58) Field of Classification Search
None
See application file for complete search history.

(56) References Cited

U.S. PATENT DOCUMENTS

| 2,240,043 A | 4/1941 | Kinser |
| 3,667,578 A | 6/1972 | Johnson |
| 4,176,733 A * | 12/1979 | Twickler ................ B64C 13/28 |
| | | 188/134 |
| 4,290,516 A | 9/1981 | West et al. |

(Continued)

OTHER PUBLICATIONS

Extended European Search Report for EP Application No. 13168099.3, dated Apr. 20, 2017, 8 pages.

*Primary Examiner* — Colby M Hansen
(74) *Attorney, Agent, or Firm* — Kinney & Lange, P.A.

(57) ABSTRACT

An integrated torque limiter/no-back device for use in an actuator with an input shaft, an output, and a gear reduction. The device includes an input ramp, an output ramp coupled to the gear reduction, a combined ramp disposed between the input ramp and the output ramp, a first plurality of balls arranged between the input ramp and the combined ramp, a second plurality of balls arranged between the combined ramp and the output ramp, a pin, and a brake. The pin extends from the input ramp to the combined ramp and coupled to the input shaft. The combined ramp, the output ramp, and the second plurality of balls therebetween are configured to operate as a torque limiter by causing the combined ramp and the output ramp to separate and the output ramp to engage the brake when the torque from the input shaft exceeds a torque threshold.

10 Claims, 5 Drawing Sheets

(56) References Cited

U.S. PATENT DOCUMENTS

| | | | |
|---|---|---|---|
| 4,480,733 A | 11/1984 | Grimm et al. | |
| 4,483,429 A | 11/1984 | Tiedeman | |
| 4,858,491 A | 8/1989 | Shube | |
| 4,909,363 A | 3/1990 | Trommer | |
| 5,092,539 A | 3/1992 | Caero | |
| 5,170,676 A | 12/1992 | Matouka et al. | |
| 5,630,490 A | 5/1997 | Hudson et al. | |
| 5,655,636 A | 8/1997 | Lang et al. | |
| 5,743,490 A | 4/1998 | Gillingham et al. | |
| 5,944,148 A * | 8/1999 | Bae | B64C 13/28 188/134 |
| 6,202,803 B1 | 3/2001 | Lang | |
| 6,974,015 B2 | 12/2005 | Gamache | |
| 7,143,888 B2 | 12/2006 | Lang | |
| 2005/0199462 A1 | 9/2005 | Gamache | |

\* cited by examiner

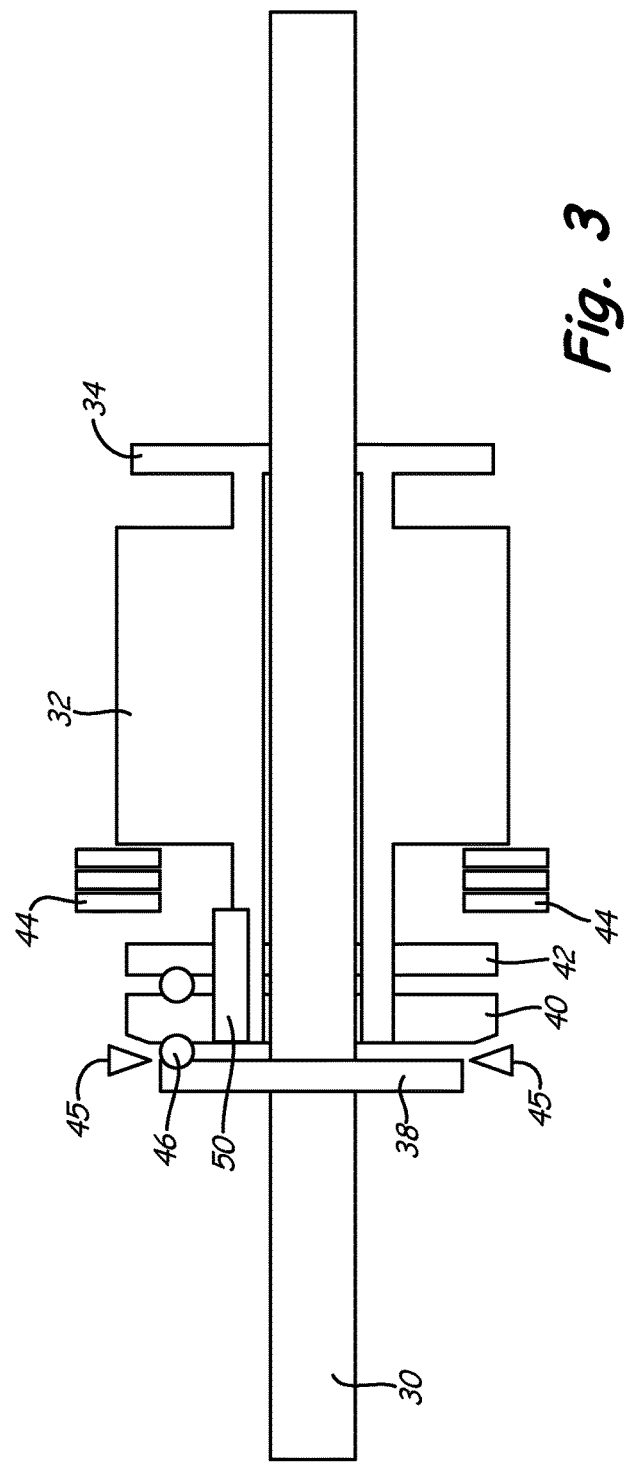

INTEGRATED TORQUE LIMITER/NO-BACK DEVICE

CROSS-REFERENCE TO RELATED APPLICATION(S)

This divisional application claims priority from application Ser. No. 13/478,172, filed May 23, 2012 entitled INTEGRATED TORQUE LIMITER/NO-BACK DEVICE, which is hereby incorporated by reference.

BACKGROUND

The subject matter disclosed herein relates to actuators in a fixed-wing aircraft. More specifically, the subject matter disclosed herein relates to an integrated torque limiter for use in an actuator for such aircraft.

The term actuator refers to a member of a class of mechanisms whose primary function is to provide a controllable force for moving an actuated element to a desired position. An actuator system typically includes an actuator, an actuated element, connecting linkage and a power source. Some actuator systems must also perform a force limiting function to prevent damage should the system become jammed. This is sometimes done through torque limiting devices on the actuator input shaft.

An aircraft actuation system is an example of a system which may use a torque limiter as a force limiter for an actuator. In an aircraft actuation system, a high lift actuator can be used to lift and hold a flight surface in a particular position under a variety of conditions. A torque limiter on this can limit the torque applied to this flight surface.

SUMMARY

An integrated torque limiter/no-back device for use in an actuator with an input shaft, an output, and a gear reduction. The device includes an input ramp, an output ramp coupled to the gear reduction, a combined ramp disposed between the input ramp and the output ramp, a first plurality of balls arranged between the input ramp and the combined ramp, a second plurality of balls arranged between the combined ramp and the output ramp, a pin, and a brake. The first plurality of balls is configured to transfer torque between the input ramp and the combined ramp, and the second plurality of balls is configured to transfer torque between the combined ramp and the output ramp. The pin extends from the input ramp to the combined ramp and coupled to the input shaft. The combined ramp, the output ramp, and the second plurality of balls therebetween are configured to operate as a torque limiter by causing the combined ramp and the output ramp to separate and the output ramp to engage the brake when the torque from the input shaft exceeds a torque threshold.

A method of limiting torque and backdriving through an actuator includes receiving input torque at an input shaft; transmitting the input torque through an integrated torque limiter/no-back device; sensing torque transferred through the integrated torque limiter/no-back device; engaging the brake when the torque transferred between the combined ramp and the output ramp exceeds a threshold torque such that the output ramp and the combined ramp separate and the output ramp engages the brake.

BRIEF DESCRIPTION OF THE DRAWINGS

FIG. 3 shows a second embodiment of an actuator with an integrated torque limiter/no-back device.

DETAILED DESCRIPTION

Figure 1:
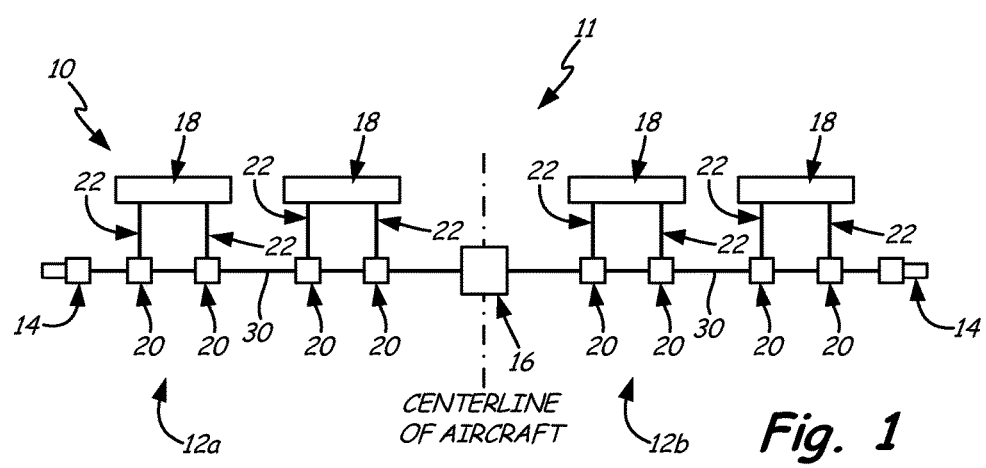
FIG. 1 is a typical slat actuation system on an aircraft.

FIG. 1 illustrates a typical slat actuation system 10 on an aircraft 11. The system is located on left wing 12a and right wing 12b of aircraft 11, and includes a position indicating device 14, power drive unit 16, slat panels 18, slat actuators 20, slat panel linkage 22 and torque shafting 30. Each slat panel 18 is connected to either wing 12a or 12b by two slat panel linkage mechanisms 22, with each linkage mechanism connected to slat actuation system 10 through a slat actuator 20. The power drive unit 16 connects to each slat actuator 20 through the torque shafting 30.

Prior to flight or upon landing, power drive unit 16 powers slat actuators 20 to extend slat panels 18 away from wings 12a and 12b and into the airstream. Slat panel linkages 22 are used to extend slat panels 18, and position indicating device 14 work with power drive unit 16 to hold slat panels 18 in place. Once airborne, power drive unit 16 powers slat actuators 20 to retract slat panels 18 toward wings 12a and 12b to cut down on drag during flight.

In some instances, there is a jam in slat panel linkage 22 when slat actuator 20 is driving the linkage 22 to extend or retract slat panel 18. When a jam occurs, power drive unit 16 could generate enough torque to damage the slat panel or structure of the aircraft. Therefore, a torque limiter is usually included in each slat actuator 20. The torque limiter senses the torque going through actuator 20 to slat panel 18. If the torque sensed gets too high, the torque limiter locks up and grounds any additional torque coming from power drive unit 16 to the wing with the lock up.

During flight, and especially when slat panels 18 are extended by slat actuators 20 into an airstream, slat panels 18 are exposed to many different forces. Some of these forces act on slat panels 18 to push in the direction opposite of the direction slat actuator 20 is extending panels 18. No-back systems prevent this load from actually driving actuator 20 backwards.

Figure 2A:
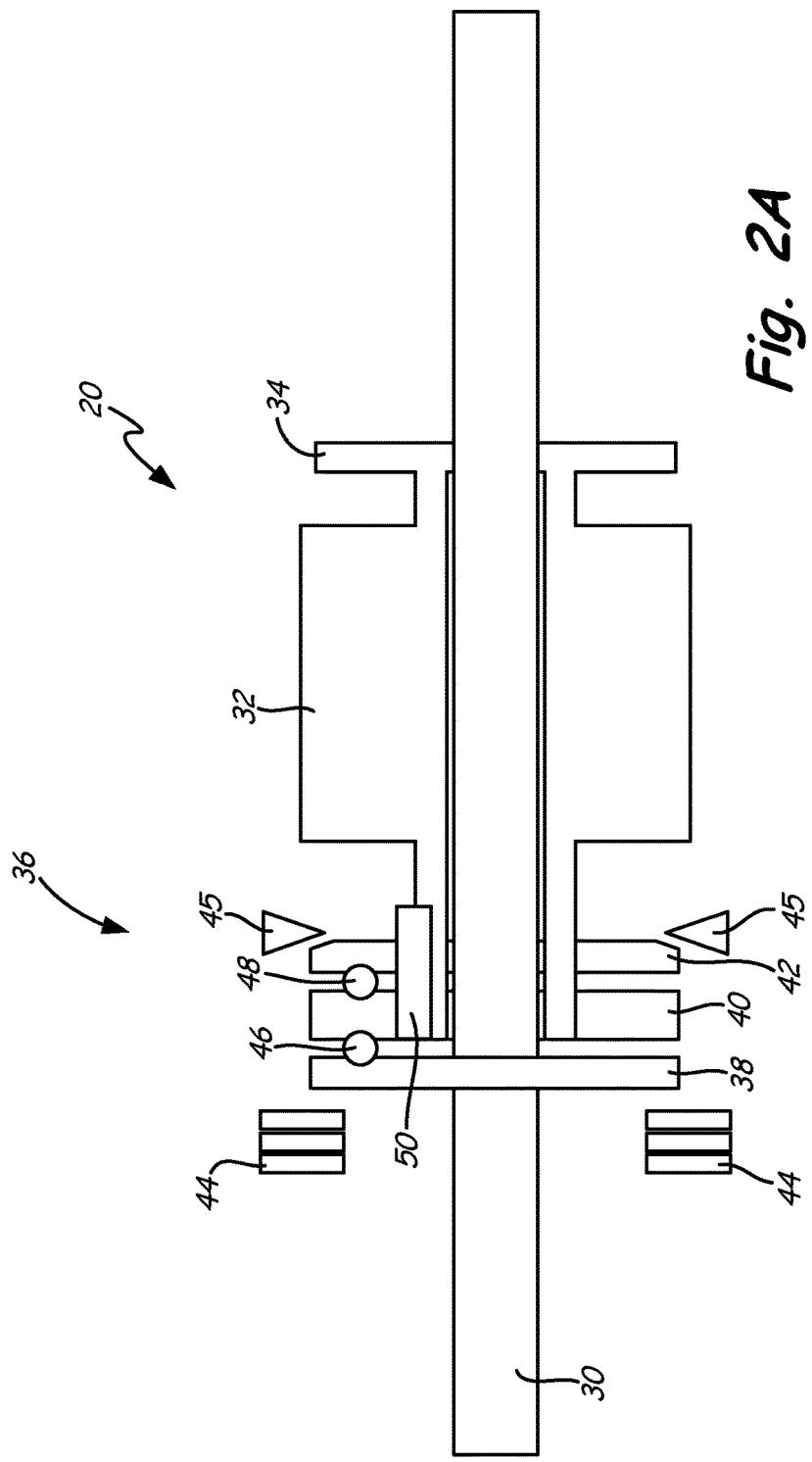
FIG. 2A shows a first embodiment of an actuator with an integrated torque limiter/no-back device.

FIG. 2A shows a first embodiment of an actuator 20 with an integrated torque limiter/no-back device 36. Actuator 20 includes input shaft 30, gear reduction 32, actuator output 34 and integrated torque limiter/no-back device 36. Integrated torque limiter/no-back device 36 includes torque limiter ball ramp 38, combined ball ramp 40, no-back ball ramp 42, brake plates 44, cone brake 45, balls 46, 48 and pin 50. While only one ball 46, 48 is respectively shown, a plurality of balls 46, 48 can be used in actuator 20.

Actuator input shaft 30 is connected to torque limiter ball ramp 38. Torque limiter ball ramp 38 is in contact with balls 46, which are in contact with combined ball ramp 40. Gear reduction 32 is connected to output 34. Actuator gear reduction 32 can be any type of gear system including but not limited to a simple gear arrangement, epicyclic gearing, worm gearing, or wheel gearing. When no-back is not engaged, ball ramp 40 pushes pin 50, which pushes no-back ball ramp 42 and gear reduction 32. When no-back is engaged, gear reduction 32 pushes no-back ball ramp 42, causing balls 48 to roll up no-back ball ramp 42 and combined ball ramp 40, separating them and engaging cone brake 45.

Figure 2B:
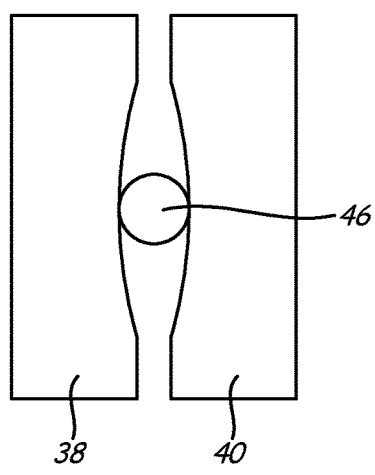
FIG. 2B shows views of two adjacent ball ramps of the integrated torque limiter/no-back device with no input torque.
Figure 2C:
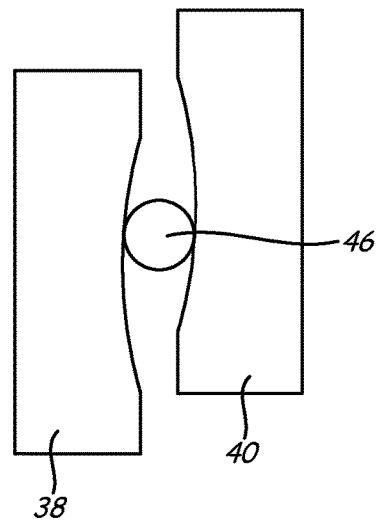
FIG. 2C show views of two adjacent ball ramps of the integrated torque limiter/no-back device with input torque.

FIGS. 2B-2C show views of adjacent ball ramps 38, 40 with ball 46 of the integrated torque limiter/no-back device 36. While ball ramps 38, 40 and ball 46 are shown, this is demonstrative of ball ramps 40 and 42 with ball 48 as well. FIG. 2B shows torque limiter ball ramp 38 and combined ball ramp 40 when no torque is acting on actuator 20. FIG. 2C shows torque being transferred from torque limiter ball ramp 38 to combined ball ramp 40 through ball 46, causing ball 46 to roll up ramp and move ramps 38, 40 away from each other.

Torque is applied to actuator 20 by rotating input shaft 30. This rotary motion is transferred from input shaft 30 to integrated torque limiter/no-back device 36 to gear reduction 32, and then from gear reduction 32 to output 34. Output 34 is connected to a rack and pinion or other type of device to translate rotary motion from gear reduction 32 to linear motion to provide drive to extend or retract slat panels through linkage mechanisms as shown in FIG. 1. In alternative embodiments, actuator 20 is connected to the line of rotation of the surface.

When torque is transferred from torque limiter ball ramp 38 to combined ramp 40 through ball 46, this causes ball 46 to roll up ramps 38, 40, as shown in FIG. 2C. As ball 46 rolls up ramps 38, 40, the angle on ramps 38, 40 cause the torque to be transferred. As ball 48 rolls up ramps 38, 40, this also causes ramps 38, 40 to separate. At a certain point, when ramps 38, 40, separate sufficiently, ramps 38 and 40 encounter brake plates 44 and input torque limiter is engaged. This engagement means that torque has reached a critical point and must be transferred out of the system so as not to damage flight surfaces. Any additional torque going into the system at this point can be grounded into an actuator housing (not shown).

When torque has not reached a critical point to engage torque limiter, and is still being transferred through actuator 20, torque transfers into no-back portion of integrated torque limiter and no-back device 36. Pin 50 engages no-back ramp 42, gear reduction 32 and combined ramp 40 so that ball 48 is not allowed to climb between ramps 40, 42, as shown in FIG. 2C. When torque through gear reduction 32 has reached a certain level pin 50 becomes disengaged from no-back ball ramp 42 and gear reduction 32, causing torque to be transferred through ball 48 (instead of pin 50). This causes balls 48 to move up ramps 40, 42, separating ramps 40, 42. Sufficient separation of ramps 40, 42 causes no-back ramp 42 to encounter cone brake 45, engaging no-back device to hold slat panels 18 steady and prevent backdriving of actuator 20.

Past actuators 20 included separate no-back and torque limiting devices. Past no-back devices typically included an inefficient gear set or two disks, balls and a set of brakes. Past torque limiting devices typically included two disks, balls and a set of brakes. Integrated torque limiter/no-back device 36 provides torque limiting and no-back features capabilities needed for actuator 20 while eliminating various parts of past systems by using combined ball ramp 40 for both torque limiting functions and no-back functions, resulting in an overall smaller envelope for torque limiting and no-back features as well as an overall smaller envelope for actuator 20. This results in weight and cost savings for actuator 20. Combining torque limiter/no-back device results in fewer parts, making a simpler and more efficient system as well.

FIG. 3 shows a second embodiment of actuator 20 with an integrated torque limiter/no-back device 36. Similar parts have the same numbers as in FIG. 2A. Actuator 20 includes input shaft 30, gear reduction 32, actuator output 34 and integrated torque limiter/no-back device 36. Integrated torque limiter/no-back device 36 includes torque limiter ball ramp 38, combined ball ramp 40, no-back ball ramp 42, brake plates 44, cone brake 45, balls 46, 48 and pin 50.

Integrated torque limiter/no-back device 36 works in the same manner as in FIG. 2A, with ramps 38, 40 acting as a torque limiter, and ramps 40, 42 acting as the no-back device. In this embodiment, cone brake 45 for no-back is located between torque limiter ball ramp 38 and combined ramp 40. The placement of cone brake 45 between ramps 38, 40 can result in faster no-back braking by working to stop the movement of both no-back ramps, to ground torque more quickly. This can result in less backdriving, which enables more precise control of flight surfaces.

Figure 4:
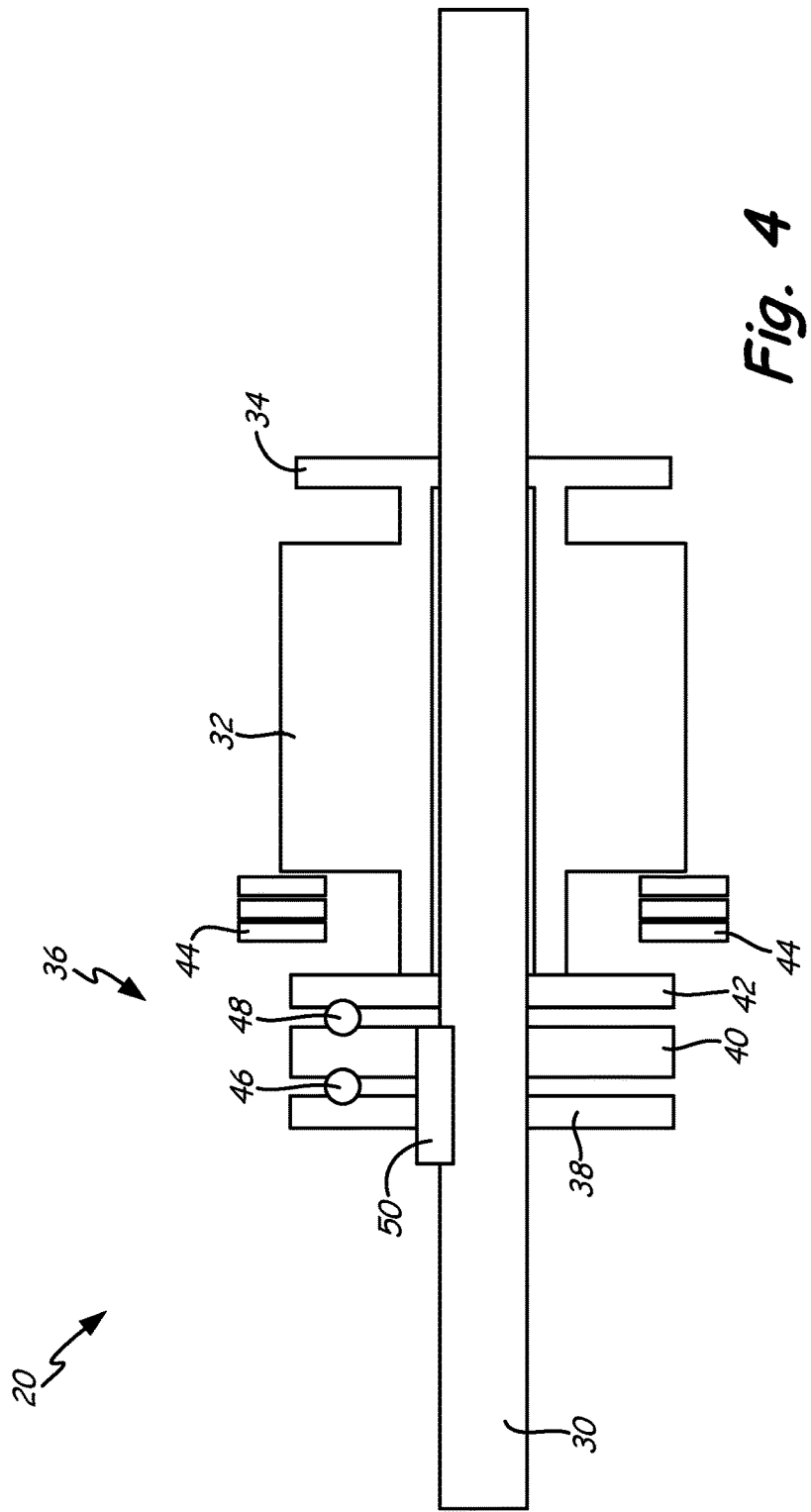
FIG. 4 shows a third embodiment of an actuator with an integrated torque limiter/no-back device.

FIG. 4 shows a third embodiment of actuator 20 with an integrated torque limiter/no-back device 36. Similar parts have the same numbers as in FIGS. 2A and 3. Actuator 20 includes input shaft 30, gear reduction 32, actuator output 34 and integrated torque limiter/no-back device 36. Integrated torque limiter/no-back device 36 includes ball ramp 38, combined ball ramp 40, ball ramp 42, brake plates 44, balls 46, 48 and pin 50.

Torque is transferred through pin 50 initially to combined ramp 40, and then is transferred to ball ramp 42 through ball 48. Ball ramp 42 transfers torque to gear reduction 32. Brake plates 44 would work to engage no-back and torque limiting portions of integrated device 36.

Actuator 20 with integrated torque limiter/no-back device 36 shown in FIG. 4 can provide additional space and weight savings by eliminating a set of brakes in actuator 20. This embodiment may result in a slower reaction time of integrated torque limiter/no-back device 36, and may be best used in systems with lower loads or which are less prone to jamming.

Integrated torque limiter/no-back device 36 provides actuator with no-back and torque limiting capabilities while reducing weight and space needed for past actuators which had separate torque limiting and no-back systems. Using combined ball ramp 40 to provide no-back and torque limiting system functions eliminates at least one disk, making an overall simpler actuator with fewer parts needed to provide no-back and torque limiting abilities for an aircraft system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. An integrated torque limiter/no-back device for use in an actuator with an input shaft driven by a power drive unit, an output and gear reduction for transmitting rotary motion from the input shaft to the output, the device comprising:
   an input ramp;
   an output ramp coupled to the gear reduction;

a combined ramp disposed between the input ramp and the output ramp, wherein the combined ramp comprises a unitary body having a first face and a second face opposite the first face;

a first plurality of balls between the input ramp and the combined ramp that engage the first face of the unitary body, each ball of the first plurality of balls simultaneously contacting the input ramp and the combined ramp, wherein the input ramp, the combined ramp, and the first plurality of balls are configured to transfer torque between the input ramp and the combined ramp;

a second plurality of balls between the combined ramp and the output ramp that engage the second face of the unitary body, each ball of the second plurality of balls simultaneously contacting the combined ramp and the output ramp, wherein the combined ramp, the output ramp, and the second plurality of balls are configured to transfer torque between the combined ramp and the output ramp;

a pin extending from the input ramp to the combined ramp and coupled to the input shaft; and a brake adjacent to the output ramp;

wherein the combined ramp, the output ramp, and the second plurality of balls therebetween are configured to operate as a torque limiter by causing the combined ramp and the output ramp to separate and the output ramp to engage the brake when the torque from the input shaft exceeds a torque threshold.

2. The integrated torque limiter/no-back devise of claim 1, wherein the combined ramp, the input ramp, the first plurality of balls therebetween, and the pin are configured to separate the combined ramp and the input ramp such that the output ramp engages the brake when torque from the output of the gear reduction exceeds the torque from the input shaft.

3. The integrated torque limiter/no-back device of claim 2, wherein the brake comprises one of a brake plate and a cone brake.

4. The integrated torque limiter/no-back device of claim 1, wherein excess torque is grounded through the brake by restraining movement of the output ramp when the torque from the input shaft exceeds the torque threshold.

5. The integrated torque limiter/no-back device of claim 2, wherein the brake prevents movement of one or more of the output shaft and the combined shaft when torque from the output of the gear reduction exceeds the torque from the input shaft.

6. The integrated torque limiter/no-back device of claim 1, wherein the device comprises no more than three ramps.

7. A method of limiting torque and backdriving through an actuator, the method comprising:

receiving input torque at an input shaft;

transmitting the input torque through an integrated torque limiter/no-back device comprising:

an input ramp;

an output ramp coupled to the gear reduction;

a combined ramp disposed between the input ramp and the output ramp, wherein the combined ramp comprises a unitary body having a first face and a second face opposite the first face;

a first plurality of balls between the input ramp and the combined ramp that engage the first face of the unitary body, each ball of the first plurality of balls simultaneously contacting the input ramp and the combined ramp, wherein the input ramp, the combined ramp, and the first plurality of balls are configured to transfer torque between the input ramp and the combined ramp;

a second plurality of balls between the combined ramp and the output ramp that engage the second face of the unitary body, each ball of the second plurality of balls simultaneously contacting the combined ramp and the output ramp, wherein the combined ramp, the output ramp, and the second plurality of balls are configured to transfer torque between the combined ramp and the output ramp;

a pin extending from the input ramp to the combined ramp and coupled to the input shaft; and a brake adjacent to the output ramp;

sensing torque transferred through the integrated torque limiter/no-back device; and engaging the brake when the torque transferred between the combined ramp and the output ramp exceeds a threshold torque, causing the output ramp and the combined ramp to separate and the output ramp to engage the brake.

8. The method of claim 7 and further comprising:

sensing torque transferred between the combined ramp and the input ramp; and engaging the brake when a back-driving torque transferred between the combined ramp and the input ramp exceeds the input torque, causing the pin to disengage one of the input ramp and the combined ramp to engage the brake.

9. The method of claim 8, wherein engaging the brake includes engages one of a cone brake or a brake plate.

10. The method of claim 7, wherein transmitting the input torque through the integrated torque limiter/no-back device utilizes no more than three ramps.

* * * * *